Jan. 22, 1957 L. CAPOCCI 2,778,588
HOLDER FOR BROOMS AND THE LIKE
Filed Dec. 29, 1952

INVENTOR.
Leonardo Capocci
BY Nathaniel Frucht
ATTORNEY

United States Patent Office 2,778,588
Patented Jan. 22, 1957

2,778,588

HOLDER FOR BROOMS AND THE LIKE

Leonardo Capocci, Providence, R. I.; Anna Bruno, administratrix of said Leonardo Capocci, deceased, assignor to Luisa Capocci, Providence, R. I.

Application December 29, 1952, Serial No. 328,427

1 Claim. (Cl. 248—112)

The present invention relates to supporting fixtures for brooms and the like, and has particular reference to holding devices adapted for domestic use.

The principal object of the invention is to provide a holder for attaching to a wall or other structure for suspending brooms and other implements having handles.

Another object of the invention is to provide a holder for implements having handles, which extends outwardly when in use and is retractable against its supporting structure when not in use.

A further object of the invention is to provide a holder for domestic implements with handles, which is made of a single length of resilient wire material.

An additional object of the invention is to provide a holder for domestic implements which may be easily attached at an appropriate point on the wall of a room or other structure.

Still another object of the invention is to provide a holder which is adapted to retain a number of household implements in suspension therein.

Another object of the invention is to provide a holder which can be made at low manufacturing cost.

With the above and other objects and advantageous features in view, the invention consists of a novel arrangement of parts more fully described in the detailed description following, in conjunction with the accompanying drawings, and more specifically defined in the claim appended thereto.

Figure 1:
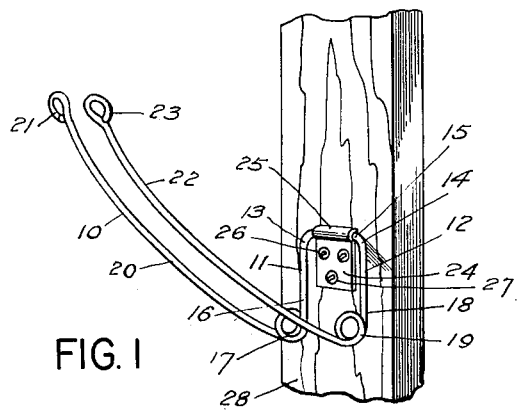
Fig. 1 is a perspective view of a preferred form of holder in extended position, shown mounted on a vertical support base.

It has been found desirable to provide a holder for suspending brooms and similar implements with handle, made of a single length of resilient wire material, and having two spaced arms across which a number of implements may be mounted with their handles suspended between, the arms being swingingly movable so as to be selectively swung forwardly when the holder is in use and swung upwardly and rearwardly out of the way when the holder is not in use. To this end I take a piece of resilient wire stock, preferably of 3/16" diameter, and shape it to provide two downwardly extending legs connected by a cross piece, each leg terminating in a coil loop from which an arcuately curved arm projects upwardly and outwardly at an angle of approximately 45 degrees, each arm terminating in an eye loop, the arms being generally parallel and in preferably slightly converging relation. A flat support plate, which may be attached to a wall or other fixture, rotatably receives the cross piece within a hinge roll portion thereof.

Referring to the drawings, the novel holder 10 comprises a single length of wire bent to provide two downwardly depending legs 11, 12, in spaced parallel relation, the upper end 13 of the leg 11 and the upper end 14 of the leg 12 being connected by a cross piece 15, the lower end 16 of the leg 11 being looped over to form a spring coil 17, and the lower end 18 of the leg 12 being similarly looped over to form a spring coil 19. An arcuate arm 20 extends outwardly and upwardly from the spring coil 17 and is curled at its terminus to provide an eye 21, and a second arcuate arm 22 similarly extends outwardly and upwardly from the spring coil 19 in spaced relation to the arm 20 and is curled at its terminus to provide an eye 23. The arms 20, 22 slightly converge towards each other, and each extends outwardly the same distance, the eyes blunting the ends of the arms, whereby personal contact with the ends of the arms will not result in bodily injury, and the spring coils interposing a resilient connection between the arms and the associated legs.

Figure 2:
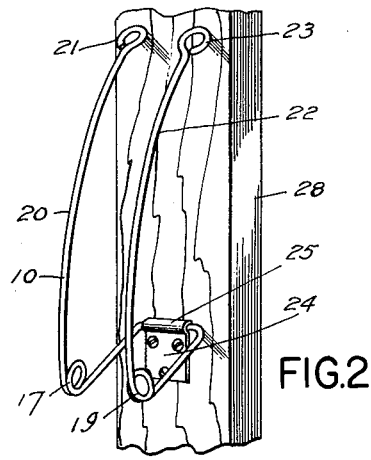
Fig. 2 is a view similar to Fig. 1, the holder being in retracted position.

The holder is mounted on a flat base plate 24 with the cross piece 15 pivotally gripped within the hinge roll 25 of the plate 24, which has screw holes 26 in which screws 27 may be inserted to attach the plate against a suitable support base 28 whereby the arms may be either swung outwardly with the legs flat against the support base when the holder is in use, see Fig. 1, or upwardly and backwardly with the legs extending forwardly from the support base, see Fig. 2, when the holder is not in use.

Figure 3:
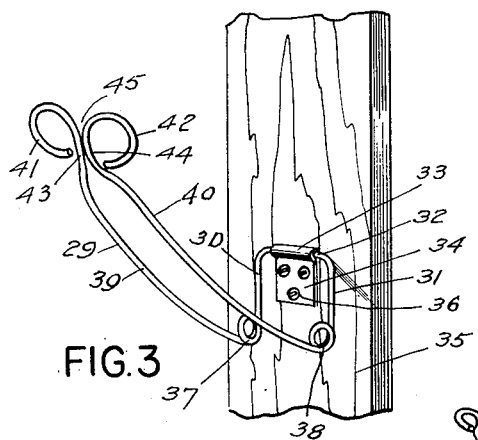
Fig. 3 is a perspective view showing a modified form of holder.

The holder may be modified as shown in Fig. 3, which illustrates a holder 29 with legs 30, 31 having a cross piece 32 pivotally gripped within the rolled end 33 of a flat plate 34 which is attached to a support base 35 by means of screws 36, the legs having ends looped over to form coil springs 37, 38 from which arcuate arms 39, 40 extend outwardly in spaced relation with their termini curled over to provide enlarged eyes 41, 42 which have their inner edges in close proximity as at 43, 44, whereby a narrow passageway 45 is provided which may be resiliently spread to afford passage of a handle attached to a household implement and returns to its normal position to maintain the implement mounted onto the holder.

Figure 4:
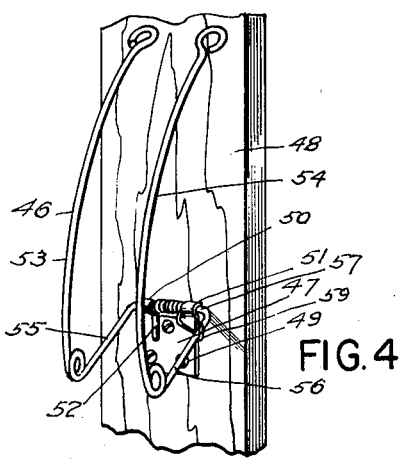
Fig. 4 is a perspective view of a further modified form of holder having a coil spring.

Fig. 4 illustrates another modified holder 46 pivotally mounted on a plate 47, which is secured to a support base 48 by screws 49, the plate 47 having two spaced hinge rolls 50, 51 and a recess 52. The holder 46 has two arcuate arms 53, 54 and two legs 55, 56 connected by a cross piece 57 which is rotatably mounted within the hinge rolls, the cross piece having a coil spring 58 over it intermediate the spaced ends, one terminal of the spring being bent to provide a hook 59 for the leg 55, the other terminal of the spring not shown, being seated within the recess 52 whereby the arms are resiliently maintained against the support base when the holder is not in use and are forwardly extended against the coil spring tension when the holder is in use. The coil spring is preferably strong enough to exert sufficient tension to press the arms against the support base when the holder has implements mounted thereon. The arms 53, 54 and their associated legs 55, 56, preferably have intermediate spring ends, as illustrated.

Figure 5:
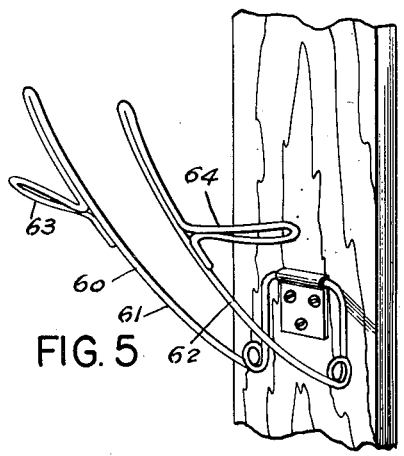
Fig. 5 is a perspective view of another modified form of holder having integral article hangers.

Fig. 5 illustrates a modified holder 60 having spaced arcuate arms 61, 62 which are bent to form slightly curved side hooks 63, 64 on which articles may be hung.

Figure 6:
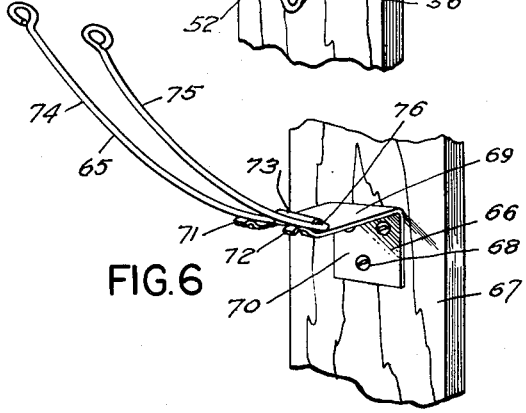
Fig. 6 is a perspective view of another modified form having an angle attachment plate.

Another modified construction of a holder 65 is illustrated in Fig. 6 which includes an angle iron 66 secured to a support base 67 by screws 68, the angle iron having an upper horizontal plate 69, and a vertical plate 70, the horizontal plate having two spaced forwardly extending stops 71, 72 and a roll hinge 73 intermediate the stops and rearwardly positioned therefrom, whereby the holder 65, which includes two arcuate spaced arms 74, 75 connected by a cross piece 76 which is pivotally mounted within the hinge 73, may be securely held in a forward extended position when household implements are mounted thereon.

It is now clear that my novel construction provides a holder for household implements which has distinctive advantages over standard types of holders. The extended spaced arms provide enough room to securely mount for storage a number of domestic articles such as brooms, mops, hammers, rakes and the like. Since the holder is pivotally attached so that it may be swung upwardly against its support base when not in use and forwardly when in use, it lends itself to being placed in restricted and limited space enclosures in the home. Further, my novel construction has the commercial advantage that it is made from a single wire, with resulting low manufacturing cost.

Although I have described a specific constructional embodiment of my invention, it is obvious that changes in the size, shape and arrangement of the parts may be made to meet different requirements, without departing from the spirit or scope of the invention as defined in the appended claim.

I claim:

A device for holding household implements, comprising a base plate adapted to be attached to a support base, said base plate having a pair of spaced, aligned hinge rolls, and a holder formed from a single piece of resilient wire and including a cross piece rotatably mounted in said hinge rolls, a leg depending downwardly at each end of the cross piece, said legs being in parallel relation, a spring coil at the lower end of each leg, additional spring means mounted on said holder cross piece between said hinge rolls, said additional spring means comprising a coil spring having one end grippingly engaged by said base plate and its other end in engagement with one of said legs whereby to normally bias said legs upwardly, said holder further comprising a pair of arms extending outwardly and upwardly from each spring coil at an angle of about 45° to its associated leg, said arms being curved upwardly in generally parallel relation and having at their ends a curled eye portion, said arms being adapted to releasably receive therebetween a broom handle or the like.

References Cited in the file of this patent

UNITED STATES PATENTS

| | | |
|---|---|---|
| 254,692 | Rath | Mar. 7, 1882 |
| 363,752 | Lynch | May 24, 1887 |
| 370,618 | Harrison | Sept. 27, 1887 |
| 958,131 | Jackson | May 17, 1910 |
| 1,181,942 | Underwood | May 2, 1916 |
| 1,206,655 | Belcher | Nov. 28, 1916 |
| 1,554,740 | Licht | Sept. 22, 1925 |
| 1,824,710 | De Carlo | Sept. 22, 1931 |
| 1,963,434 | Bruns | June 19, 1934 |
| 2,043,620 | Hoffman | June 9, 1936 |
| 2,051,408 | Karst | Aug. 18, 1936 |
| 2,489,875 | Embree | Nov. 29, 1949 |
| 2,662,717 | Johnson | Dec. 15, 1953 |

FOREIGN PATENTS

| | | |
|---|---|---|
| 487,575 | Great Britain | of 1938 |